(12) United States Patent
Chen et al.

(10) Patent No.: US 11,529,635 B2
(45) Date of Patent: Dec. 20, 2022

(54) PREPARATION OF NANOSHEETS VIA BALL MILLING IN THE PRESENCE OF REACTIVE GASES

(71) Applicant: DEAKIN UNIVERSITY, Geelong (AU)

(72) Inventors: Ying Chen, Point Cook (AU); Srikanth Mateti, Highton (AU)

(73) Assignee: Deakin University, Victoria (AU)

( * ) Notice: Subject to any disclaimer, the term of this patent is extended or adjusted under 35 U.S.C. 154(b) by 157 days.

(21) Appl. No.: 16/309,157

(22) PCT Filed: Jun. 14, 2017

(86) PCT No.: PCT/AU2017/050590
§ 371 (c)(1),
(2) Date: Dec. 12, 2018

(87) PCT Pub. No.: WO2017/214668
PCT Pub. Date: Dec. 21, 2017

(65) Prior Publication Data
US 2019/0247858 A1  Aug. 15, 2019

(30) Foreign Application Priority Data
Jun. 14, 2016  (AU) .................................. 2016902307

(51) Int. Cl.
*B02C 17/18* (2006.01)
*C01G 39/06* (2006.01)
(Continued)

(52) U.S. Cl.
CPC .......... *B02C 17/1885* (2013.01); *B02C 17/20* (2013.01); *C01B 21/0648* (2013.01); *C01B 32/184* (2017.08); *C01B 32/205* (2017.08); *C01B 35/14* (2013.01); *C01B 35/146* (2013.01); *C01G 39/06* (2013.01); *C01G 41/00* (2013.01); *B82Y 40/00* (2013.01);
(Continued)

(58) Field of Classification Search
CPC .............. B02C 17/1875; B02C 17/188; B02C 17/1885; B02C 17/20
USPC ......................................................... 241/18
See application file for complete search history.

(56) References Cited

U.S. PATENT DOCUMENTS

| | | | | |
|---|---|---|---|---|
| 2013/0018204 A1* | 1/2013 | Jeon | ................. | C01B 32/21 562/89 |
| 2016/0023907 A1 | 1/2016 | Handl | | |
| 2016/0185603 A1* | 6/2016 | Bozalina | ................. | C01B 32/21 252/71 |

FOREIGN PATENT DOCUMENTS

| | | | | |
|---|---|---|---|---|
| CN | 104577063 A | * | 4/2015 | ............. B82Y 30/00 |
| JP | 2017052681 A | * | 3/2017 | ............. C01G 39/06 |
| WO | 2011/032231 | | 3/2011 | |

OTHER PUBLICATIONS

Jeon, In-Yup et al., 'Large-Scale Production of Edge-Selectively Functionalized Graphene Nanoplatelets via Ball Milling and Their Use as Metal-Free Electrocatalysts for Oxygen Reduction Reaction', Journal of the American Chemical Society, 2012, vol. 135, pp. 1386-1393 (Year: 2012).*

(Continued)

*Primary Examiner* — Jessica Cahill
*Assistant Examiner* — Jared O Brown
(74) *Attorney, Agent, or Firm* — Polsinelli PC

(57) ABSTRACT

A process for producing a material in the form of nanosheets by ball milling of crystals of the material, wherein the ball milling takes place in the presence of a reactive gas.

9 Claims, 8 Drawing Sheets

(51) Int. Cl.
| | |
|---|---|
| C01G 41/00 | (2006.01) |
| C01B 35/14 | (2006.01) |
| C01B 32/205 | (2017.01) |
| B02C 17/20 | (2006.01) |
| B82Y 40/00 | (2011.01) |
| C01B 32/184 | (2017.01) |
| C01B 21/064 | (2006.01) |

(52) U.S. Cl.
CPC ...... C01P 2002/01 (2013.01); C01P 2002/52 (2013.01); C01P 2002/54 (2013.01); C01P 2002/72 (2013.01); C01P 2002/88 (2013.01); C01P 2004/03 (2013.01); C01P 2004/04 (2013.01); C01P 2004/24 (2013.01)

(56) References Cited

OTHER PUBLICATIONS

Huihui Zhu et al., 'One-step preparation of graphene nanosheets via ball milling of graphite and the application in lithium-ion batteries', Jan. 6, 2016, Springer Science+Business Media, pp. 3675-3681 (Year: 2016).*

Wang, P., et al., Hydrogen in mechanically prepared nanostructured h-BN: a critical comparison with that in nanostructured graphite, Applied Physics Letters, 2002, pp. 318-320, vol. 80, No. 2.

Jeon In-Yup, et al., Large-Scale Production of Edge-Selectivity Metal-Free Electrocatalysts for Oxygen Reduction Reaction, Journal of the American Chemical Society, 2012, pp. 1386-1393, vol. 135.

Ong T.S., et al., Effect of atmosphere on the mechanical milling of natural graphite, Carbon, 2000, pp. 2077-2085, vol. 38.

Francke, M. et al. , Modification of carbon nanostructures by high energy ball-milling under argon and hydrogen atmosphere, Carbon, 2005, pp. 1204-1212, vol. 43.

Lei, Weiwei, et al., Boron nitride colloidal solutions, ultralight aerogels and freestanding membranes through one-step exfoliation and functionalization, Nature Communication DOI: 10.1038/ncomms9849.

Deepika, et al., High-Efficient Production of Boron Nitride Nanosheets via an Optimized Ball Milling Process for Lubrication in Oil, Scientific Reports, 4: 7288, DOI: 10.1038/srep07288.

Mungse, et al., Synthesis, Dispersion and Lubrication Potential of Basal Plane Functionalization Alkylated Graphene Nanosheets, RSC Adv., 2015, pp. 25565-25571, vol. 5.

Int'l Application No. PCT/AU2017/050590, International Preliminary Report on Patentability dated Dec. 18, 2018.

In-Yup Jeon, et al., Large Scale Production of Edge-Selectively Functionalized Graphene Nanoplatelets via Ball Milling and Their Use as Metal-Free Electrocatalysts for Oxygen Reduction Reaction, Journal of the American Chemical Society, Jan. 30, 2013, vol. 132, No. 4, pp. 1386-1393.

Zhu Huihui, et al., "One-Step Preparation of Graphene Nanosheets via Ball Milling of Graphite and the Application in Lithium-ion Batteries", Journal of Materials Science, Kluwera Academic Publishers, Dordecht, Jan. 6, 2016, vol. 51, No. 8, pp. 3675-3683.

Melanie Francke, et al., "Modification of Carbon-Nanostructures by High Energy Ball-Milling under argon and Hydrogen Atmosphere", Carbon, May 1, 2005, vol. 43, No. 6, pp. 1204-1212.

Fermin Cuevas, et al., "Synthesis, STructural and Hydrogenation properties of Mg-rich MgH 2-TiH 2 Nanocomposites Prepared by Reactive Ball Milling Under Hydrogen Gas", Physical Chemistry Chemical Physics, Jan. 1, 2012, vol. 14, No. 3, pp. 1200-1211.

Deakin University, Application No. 17812310.5, Extended European Search Report dated Jan. 13, 2020, 10 pages.

* cited by examiner

PREPARATION OF NANOSHEETS VIA BALL MILLING IN THE PRESENCE OF REACTIVE GASES

FIELD OF THE INVENTION

The present invention relates to nanomaterials, in particular two dimensional nanosheets.

The invention also relates to the production of nanosheets and to nanosheets produced in accordance with the invention.

BACKGROUND OF THE INVENTION

Two-dimensional materials, such as graphene, boron nitride (BN), and transition metal dichalcogenides (TMD) nanosheets, have exceptional electronic, mechanical and physical properties, which are appealing for both fundamental science and practical applications. With successive thickness reduction of the bulk crystals to nanometer scale, the inherent properties of these bulk materials are altered. For example, electrons in graphene behave as Dirac fermions, $MoS_2$ nanosheet undergoes a phase change from an indirect to direct band gap semiconductor, and BN nanosheets exhibit an exceptional ability to adsorb molecules.

These wonderful materials have been produced in large quantities using various techniques. Ball milling or grinding can be used for thickness reduction of layered materials and even for graphene and nanosheet production but liquid surfactants or solid exfoliation agents have conventionally been used in the milling processes as most ball milling treatments of starting bulk crystals can destroy the material structure and/or introduce a great number of defects. To reduce the damage, low milling energy has been used together with various surfactant solutions (i.e. MDF, NMP). Wet milling media can effectively reduce the structural damage and prevent agglomeration events, but this also introduces contaminants which may be difficult to remove, consequently affecting nanosheet properties and applications.

Dry milling of bulk crystals with solid exfoliation agents (such as dry $CO_2$, sulphur, salt, etc.) is another successful approach. For example, dry $CO_2$ has been used in a ball milling process to produce graphene sheets with carboxylated edges and a significant amount of oxygen is introduced into graphene.

However, in these processes, post-milling treatment is required to remove the surfactants or the agents from the nanosheets, which adds to production costs and can also introduce other contaminations.

The present invention seeks to provide an alternative process for the production of nanosheet materials that may overcome the disadvantages associated with the known processes described above.

SUMMARY OF THE INVENTION

Accordingly, the present invention provides a process for producing a material in the form of a nanosheet by ball milling of crystals of the material, wherein the ball milling takes place in the presence of a reactive gas. In this embodiment the process is carried out in the absence of solid or liquid exfoliation agents. As noted above, these types of exfoliation agents must be removed in conventional processes to yield useful nanosheets.

It is believed that reactive ball milling in particular types of a gaseous environment is a new approach to producing various nanosheets from bulk crystalline materials.

The present invention also provides nanosheets when produced in accordance with the invention.

The present invention also relates to doped nanosheets and to the composite nanosheets of different materials.

Nanosheets produced in accordance with the invention may be used in a variety of applications in which nanosheets are known to be useful. The nanosheets may be particularly useful in enhancing the lubricating properties of lubricant formulations, such as engine and gear oils.

BRIEF DESCRIPTION OF THE DRAWINGS

Embodiments of the invention are illustrated with reference to the following non-limiting drawings in which FIGS. 1-12 report results and/or observations discussed in the examples. Further detail about each figure is included below.

DETAILED DESCRIPTION OF THE INVENTION

Figure 1:
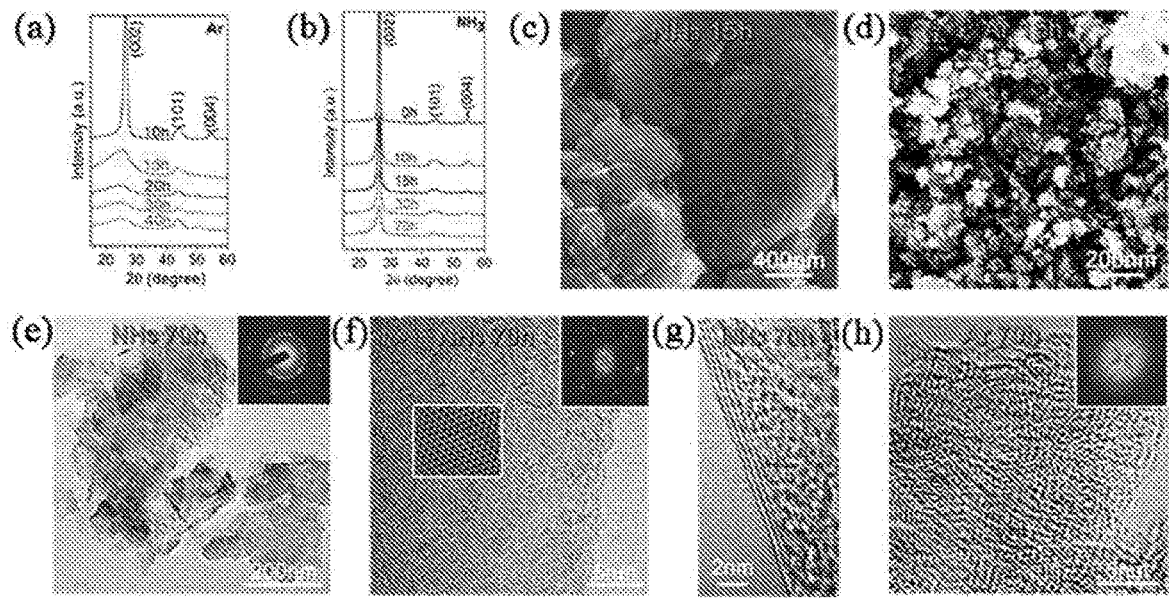
FIG. 1. Different structural changes of graphite under ball milling in different gases. XRD pattern of graphite milled in Ar (a) and $NH_3$ (b) for different times. SEM images showing different morphologies of graphite milled in $NH_3$ (c) and Ar(d) gases. TEM images revealing different structures of the graphite milled for 70 h in $NH_3$ (e, f, g), and in Ar (h). Insets show SAD patterns.

In accordance with the invention it has been found that nanosheets may be prepared by reactive ball milling of bulk crystalline materials in a gaseous environment.

The gas used in the ball milling is believed to participate in chemisorption and/or mechanochemical reactions that favour production of nanosheets by exfoliation of bulk crystalline materials. The exact mechanism by which molecules of the gas interact with the bulk crystalline material is not known. However, various possibilities in this regard are discussed below with reference to specific crystalline materials and gases.

Herein the term nanosheet is used in a conventional sense to denote a layered structure that is essentially two-dimensional in character. The nanosheet is typically less than 10 nm in thickness and may extend in other directions in micron dimensions.

Producing nanosheets in accordance with the present invention may yield nanosheets with no contaminants or reduced contaminants compared to conventional processes, for example processes employing a solid or liquid exfoliating agent. As a result the present invention may avoid or reduce post-production treatment to remove contaminants in the nanosheets produced.

The nanosheets are produced by exfoliation of (bulk) crystalline materials that have a layered structure. By way of example, the material may be graphite, boron nitride, molybdenum disulphide or tungsten disulphide.

The gas used when ball milling the crystalline material may be ammonia or a hydrocarbon gas, such as methane, ethane, ethene, ethyne or propane.

By way of additional example the following combinations of crystalline material and gas have been found to be useful: boron nitride with ammonia, methane, ethane or ethyne; graphite and ammonia; molybdenum disulphide and ammonia, molybdenum disulphide and methane; and tungsten disulphide with ammonia or ethyne.

The choice of gas may influence doping of the nanosheets produced. For example, whereas ball milling boron nitride in ammonia produces pure boron nitride nanosheets, ball milling in a carbon-containing gas can lead to production of carbon-doped boron nitride nanosheets.

In accordance with the invention it has been found that nanosheets of materials such as graphene, BN, $MoS_2$, and $WS_2$ can be produced by ball milling of their bulk crystals in the presence of a reactive gas and the obtained nanosheets remain flat and maintain their single-crystalline structure with a low defect density even after a long period of time. It has also been observed that the nanosheets produced exhibit dramatically different behaviour of 2D nanomaterials in different environments. Thus the same high-energy ball milling treatment using milling atmospheres such as air, nitrogen or argon produces to nanosized particles with a disordered structure. The present invention reveals that during the milling process, substantial amount of atoms or molecules of reactive gas are absorbed on the nanosheets and chemical bonds are formed at the defects or edges created by high-energy milling impacts, preventing cross-linking and the fracture.

In an embodiment of the invention the process involves reactive ball milling of crystals of the chosen material in the presence of one reactive gas followed by further reactive ball milling in the presence of another reactive gas. This embodiment may enable the production of nanosheets that are doped with a variety of species based on the reactive gases that are used. For example, ball milling of BN powder in ammonia produces pure BN nanosheets; ball milling in hydrocarbon gas process C doped BN nanosheets. In the case of $WS_2$, ball milling in ammonia produces N doped nanosheets and in a hydrocarbon gas, C doped nanosheets will be produced.

In another embodiment the reactive ball milling takes place using a mixture of reactive gases, for example a mixture of ethyne and ammonia. It will produce dual-doped (C, N) nanosheets.

In accordance with the present invention exfoliation of the starting material may be influenced by various milling parameters including milling time, milling speed, milling ball size and ball-to-material ratio. The effect of each of these variables, and combinations of them, can be assessed by scanning electron microscopy (SEM).

Typically, the milling balls will be made of stainless steel. Typically, the balls will have a diameter of 1-25 mm.

The ratio of milling balls to starting material is typically 5:1 to 20:1, for example 10:1 to 15:1 depending on the starting materials.

Milling takes place using conventional ball milling equipment.

Milling is usually undertaken for a number of hours. Typically, the overall milling time is less than 30 hours, for example from 20 to 30 hours. The milling time required to achieve exfoliation will depend upon the intensity of ball milling and the reactive gas(es) used.

A typical combination of ball milling parameters may be:

| | |
|---|---|
| Stainless steel balls | 25 mm diameter |
| Ball-to-material ratio | 10:1 |
| Milling speed | 150 rpm |
| Milling time | 20 hours |

In another embodiment the invention may be applied to produce composite nanosheets by reactive ball milling of mixtures of starting materials in the presence of a reactive gas. For example, this embodiment may be implemented by ball milling of graphite and hexagonal boron nitride (h-BN) in the presence of ammonia gas. The weight ratio of starting materials may be varied. In an embodiment the weight ratio is 1:1.

Embodiments of the invention are illustrated with reference to the following non-limiting example.

Example 1

Experimental Section

The ball milling experiments were performed in a rotating high energy ball mill. In a typical experiment, several grams of powder were loaded in the milling jar with 4 hardened steel balls weighing 66 g each and having a diameter of 2.5 cm. The rotating speed was 150 rpm. At the beginning of the experiment, the milling jar was evacuated (vacuum) and then filled with a selected gas at 300 kPa. The structure of the samples was studied with X-ray powder diffraction (XRD) using a PANalytical X'Pert Pro diffractometer (Cu K-alpha radiation, λ=0.15418 nm). The morphologies of the samples were studied using a scanning electron microscope (SEM, Supra 55VP) and a transmission electron microscope (TEM, JEOL 2100F). The nitrogen content was measured using a LECO TC 600 Oxygen and Nitrogen Determinator. Near edge X-ray absorption fine structure (NEXAFS) analysis was conducted at the Australian Synchrotron centre with the step of photon energy of 50 meV for carbon and nitrogen edges and 20 meV for boron edge. Cypher scanning probe microscope (SPM) was used to measure the surface friction force of samples. A BN nanosheet sample was exfoliated on 90 nm silicon oxide covered silicon wafer via the scotch tape method using single crystal hBN. The silicon wafer and BN particles were placed inside the sealed chamber of selected atmosphere with 350 kPa pressure for 1 day. It was transferred to the SPM and the friction force was measured on a flat flake of sample of approximately 10 μm*5 μm after different periods of time up to 1 day. The difference of two measurements was the friction deviation of the surface in the selected atmosphere and in air.

Calculations of the mechanical properties of the nanosheets were carried out using (DFT with the projector augmented wave method and the PBE exchange correlation functional as implemented in the plane-wave basis Vienna Ab-initio Simulation Package (VASP) code. A dispersion correction was incorporated to account for the long-range van der Waals interaction. An energy cut-off of 500 eV was used for the plane-wave expansion and a Monkhorst-Pack k-point mesh of 5×5×1 was used for sampling the first Brillouin zone. A supercell containing a single layer of defective graphene with 23 carbon atoms and gas molecules ($N_2$ or $NH_3$), and 20 Å of vacuum is used to avoid the interaction between periodical images. All the geometric structures were fully relaxed until energy and force were converged to $10^{-5}$ eV and 0.005 eV/Å, respectively. An in-planar biaxial strain (ε) was added along the direction of lattice vector a and b from 0 to 20%. Here $\varepsilon=a/a_0-1$, where a and $a_0$ are the strained and the equilibrium lattice constants of defective graphene, respectively.

Results and Discussion

Under violent ball impacts, materials normally suffer from severe fracturing and plastic deformation until complete loss of the original crystalline structure. For example, in the case of milling of graphite in Ar gas at 300 kPa, the X-ray diffraction (XRD) patterns in FIG. 1a show a typical gradual disordering process of the crystalline structure of graphite to full amorphization after just 20 hours of milling. Similar amorphization of graphite after ball milling has been reported previously in the literature. As revealed by the XRD patterns presented in FIG. 1b, in a different milling atmosphere of ammonia ($NH_3$) gas at the same pressure and milling parameters, the milling energy that destroyed the hexagonal structure of graphite in Ar gas could not realise the same phase transformation outlined above. The graphitic structure can still be seen clearly from the XRD patterns taken from the sample after milling for 20 hours and it does not disappear even after 70 hours of extended milling. Although the intensity of the diffraction peaks decreases as milling time increases and the peaks also broaden as the result of graphite exfoliation, the XRD patterns clearly suggest that $NH_3$ gas slows down or prevents disordering of graphite structure under high-energy impacts associated with ball milling.

Different morphology changes were observed for the graphite samples milled in the two different gases. Scanning electron microscopy (SEM) images in FIG. 1 show that, in the case of milling in $NH_3$, the starting micrometer-size graphite chips transform to thin layers/sheets after 15 hours of milling (FIG. 1c). The lateral sheet size is several hundred nanometers. Extended milling treatment does not change the sample morphology even after 30 hours. An entirely different morphology was found in the samples milled in Ar. Notably, round particles of less than 100 nm were produced after 15 hours of milling (FIG. 1d).

Transmission Electron Microscopy (TEM) analysis confirms different structures and morphologies of the samples milled in different gases.

FIG. 1e shows a typical TEM image of the graphite milled in $NH_3$ for 70 hours. Most nanosheets have a thickness of a few nanometers, but few-layer graphene sheets are also found after centrifuging (FIG. 1g). The Selected Area Electron Diffraction (SAED) patterns contain multiple sets of dots with a six-fold symmetry (inset of FIG. 1e), revealing an undamaged in-plane structure of the nanosheets.

The high resolution (HR) TEM image in Figure 1f shows a good crystallinity of a single nanosheet. The Fast Fourier Transformation (FFT) (inset of FIG. 1f) shows a set of dots in the hexagonal pattern, indicating that the individual nanosheet has a single-crystal structure. The well-retained crystalline structure can be seen from the reversed FFT image in FIG. 1f. The XRD, SEM and TEM results confirm that the high-energy ball milling in $NH_3$ gas exfoliates graphite particles into thin nanosheets without destroying their in-plane structure. In stark contrast, ball milling in Ar gas for the same time produces smaller particles of disordered (amorphous) structure, as shown by the corresponding TEM images in FIG. 1h and their corresponding diffraction patterns (insets).

Figure 2:
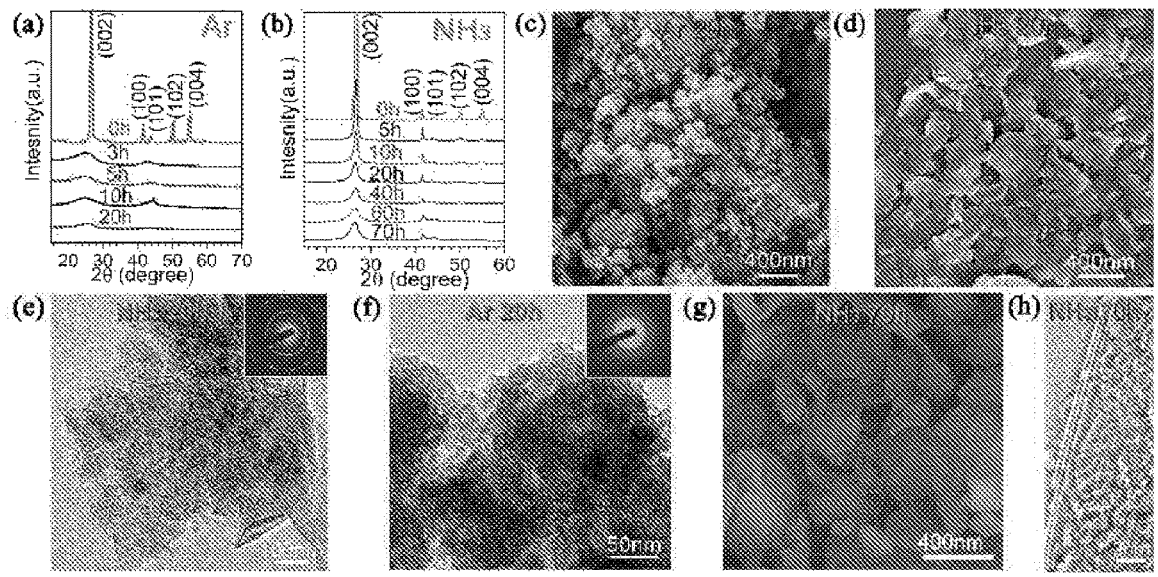
FIG. 2. Different structural changes of boron nitride (BN) during ball milling in different gases. XRD patterns of hexagonal BN milled in Ar (a) and $NH_3$ (b) for different time. SEM images of BN sample milled for 20 h in Ar (c) and in $NH_3$ (d); TEM images of BN samples after 20 h milling in $NH_3$ (e) and in Ar 20 h (f); SEM image of BN milled for 70 h in $NH_3$ (g) and its TEM image (i).

To check if the same approach would work for other materials, hexagonal (graphitic) boron nitride (h-BN) powder was also milled under the same conditions in the two gases. The XRD patterns of h-BN in FIGS. 2a and b show a similar trend as graphite. Amorphization can be seen in BN after milling in Ar for just 20 hours, while the hexagonal structure of BN can be clearly seen from the pronounced diffraction peaks even after 70 hours of milling in a $NH_3$ environment (FIG. 2b). The same differences in morphologies can be seen in the corresponding SEM images in FIGS. 2c and 2d. BN nanosheets are produced after 20 hours of milling in $NH_3$ and fine nano-sized particles are the end-product of milling in Ar under the same conditions for the same period of time. TEM analyses confirm that the BN nanosheets produced by milling in $NH_3$ have excellent hexagonal structure (FIG. 2e), while milling in Ar resulted in amorphous nanoparticles (FIG. 2f), similar to the case of graphite. Extended milling up to 70 hours did not destroy the nanosheet structure in the $NH_3$ atmosphere as revealed by the SEM and TEM images in FIGS. 2g and 2h, respectively.

Figure 3:
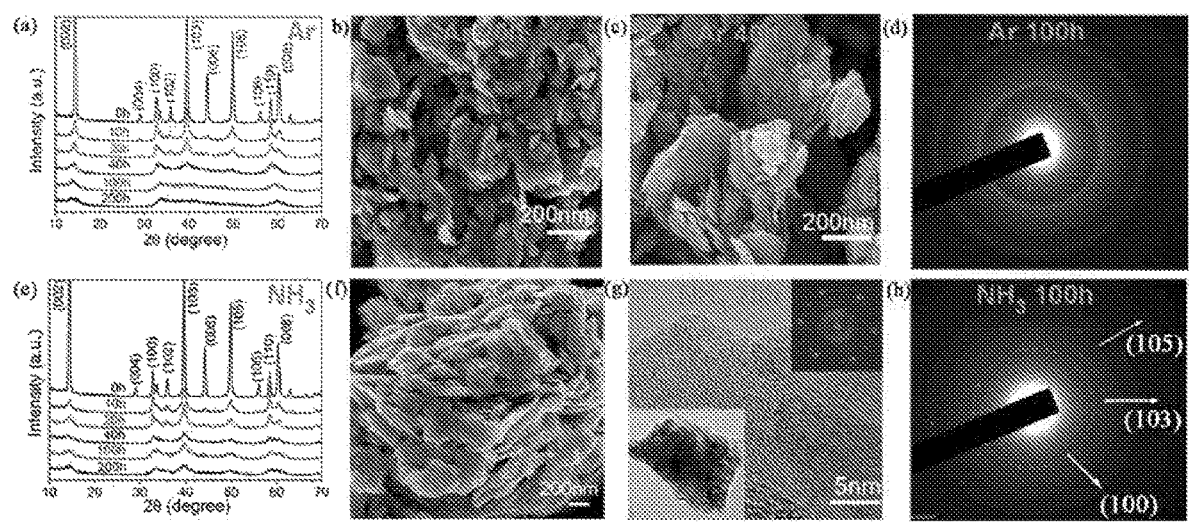
FIG. 3. Different structural changes of molybdenum disulfide ($MoS_2$) during ball milling in different gases (a) XRD patterns of $MoS_2$ after milling in Ar gas for different hours; (b, c) SEM images of $MoS_2$ after milling in Ar gas for different hours; (d) TEM microdiffraction pattern of the sample after milling in Ar for 100 hours; (f) SEM image of $MoS_2$ after milling in $NH_3$ gas for 20 hours; (g) TEM image of $MoS_2$ milled for 20 hours in $NH_3$. Insets show SAD patterns and low-amplification image. (h) TEM microdiffraction pattern of the sample after milling in $NH_3$ for 100 hours.

FIG. 3 shows that nanoplatelets of $MoS_2$ are produced in both gases, Ar and $NH_3$, after milling for 20 hours and the morphology does not change after 40 hr of milling, which is consistent with the similar XRD patterns of the samples milled for 40 or less (FIGS. 3a and 3e).

The TEM image in FIG. 3g shows a thin layer with crystalline structure. Thus, 3 atomic layers thick $MoS_2$ is more resilient to structure damage. $MoS_2$ has a lesser tendency to cross-linking, as S—S bonds are less strong than Mo-δ bonds. However, during further milling up to 100 hr, different structures and morphologies still can be seen. Comparing the XRD patterns of the samples milled for 60 and 100 hrs, it is observed that some diffraction peaks are missing from the XRD patterns of the samples milled in Ar gas and other peaks are weaker and broader than the corresponding peaks in the patterns of the samples milled in $NH_3$ gas, indicating more disordered structure in the samples milled in Ar.

The SAED patterns in FIGS. 3d and 3h, confirm that $NH_3$ gas has the same protective effect on the $MoS_2$ nanosheets. Nanoplatelets were produced in both Ar and $NH_3$ gases after short milling time and the structure was protected by ammonia gas during prolonged milling.

The protective action of $NH_3$ is more pronounced on layered materials, as the effect is less evident in Si and $TiO_2$, which have typical 3D structures that are deformed by dislocation gliding (Si) and brittle fracture (both) rather than shearing of layers. Their structure changes are almost the same after milling in Ar and $NH_3$ gases. In these cases, no nanosheets were produced. It is believed therefore that $NH_3$ gas protects nanosheet structures capable of reaction with ammonia from the impact of high-energy milling.

Figure 4:
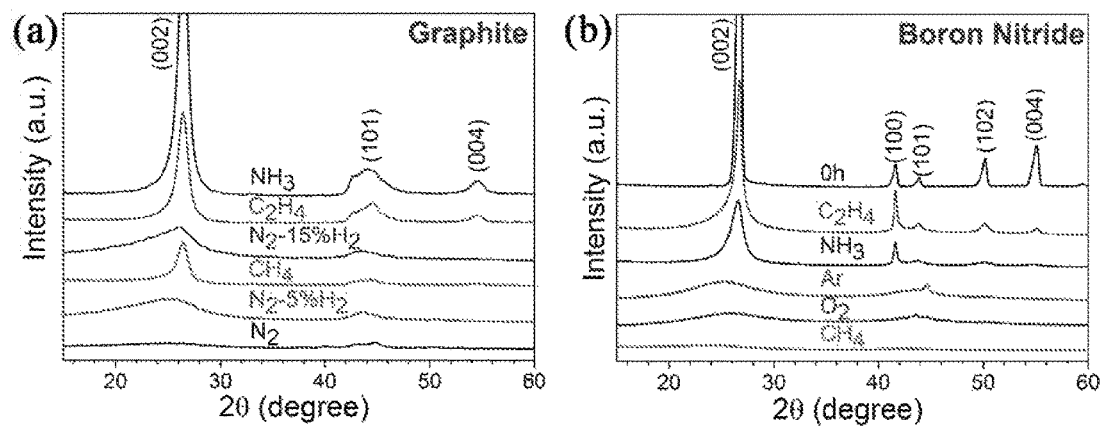
FIG. 4. XRD patterns of graphite (a) and boron nitride (b) milled in different gases for 20 hours.

Several different gases have been tested under the same milling conditions and the XRD patterns in FIG. 4a show that the graphite samples milled for 20 hours in $C_2H_4$ and $CH_4$ have sharp (002) diffraction peaks. The (004) diffraction, observable at about 55°, indicates good ordering in c direction. On the other hand, ball milling in $N_2$ and $N_2/H_2$ mixtures does not show the same effect, leading to very wide (002) diffraction peaks, similar to the samples milled in Ar. Therefore, $C_2H_4$ and $CH_4$ behave in a similar way as $NH_3$, while $N_2$ and $N_2+H_2$ are like Ar and do not provide protection. SEM analysis confirms the formation of nanosheets after milling graphite in $C_2H_4$ and $CH_4$ gases. For BN, milling in $C_2H_4$ gas also produces BN nanosheets, but $CH_4$ (and $O_2$) act like Ar gas and the corresponding XRD patterns are presented in FIG. 4b.

The XRD patterns in FIG. 4a also reveal the possible role of reactive hydrogen gas. It has been reported that pure hydrogen gas at the very high pressure of 6 MPa could have a protective effect during ball milling of graphite. In the cases of milling in $NH_3$, $C_2H_4$ and $CH_4$ gas, full decomposition of these gases into hydrogen gas under high-energy impact (local heating) did not take place substantially because the gas pressure remains low in the sealed milling chamber during the milling. Apparently, reactions happened only at active sites where dangling bonds are created as result of milling.

Milling experiments in a mixture of $N_2$ and $H_2$, which were conducted to clarify the hydrogen effect, show that after only 20 hours of milling in the presence of 15% of $H_2$, the (002) peak becomes wider than the one of the sample milled in $NH_3$ for 70 hours (FIG. 1b). However, comparison of the XRD patterns of the samples milled in $N_2$, $N_2+5\%$ $H_2$ and $N_2+15\%$ gases, shows that the (002) broadening decreases with an increase in the $H_2$ content in the atmosphere. Thus, hydrogen gas may have some protective effect but not as significant as $NH_3$.

Figure 5:
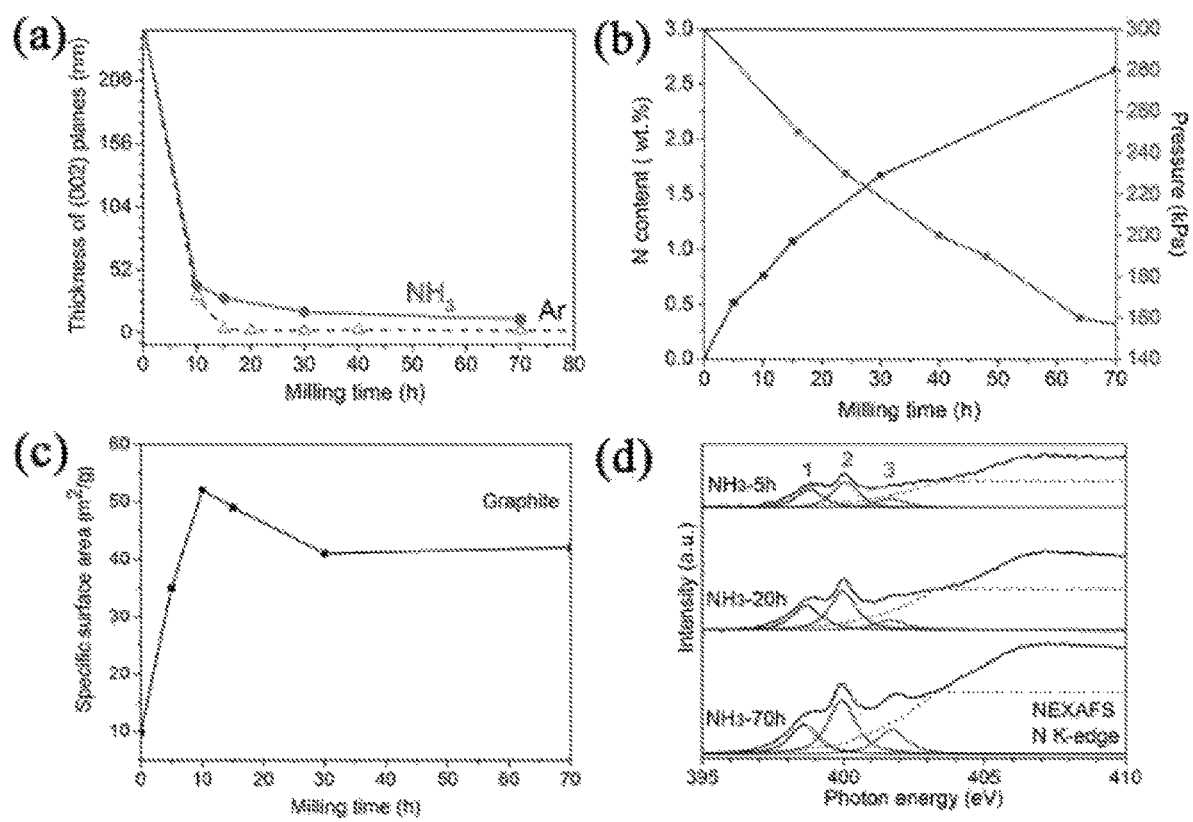
FIG. 5. Characterization of graphite after milling. (a) Graphite grain-size reduction during ball milling in two different gases. (b) $NH_3$ pressure changes during ball milling and the N content in the samples milled in $NH_3$ for different times. (c) BET surface area change of graphite milled in $NH_3$ as a function of milling time. (d) N K-edge NEXAFS spectra of graphite milled in $NH_3$ for different periods of time.

Careful analysis of the XRD patterns finds that, for bulk (micrometer-sized) materials, different milling atmospheres apparently do not have a noticeable effect at the beginning of the milling, when the concentration of defects in the material is still low. FIG. 5a shows the crystal size reduction as a function of the milling time, derived from the diffraction peak width of (002) planes in FIGS. 1a and 1b. It is observed that the grain size of graphite is reduced sharply within the first 10 hours in both gases and there is almost no difference between them until the flake thickness decreases to about 50 nm. During further milling, the nanosheets formed and became thinner gradually in $NH_3$ gas; while in Ar gas, the graphite particle size continues to drop. Clearly, some gases promote the formation of nanosheets and also protect them from the damage caused by high-energy ball milling.

A significant pressure drop of $NH_3$ gas from 300 kPa to 160 KPa was observed inside the sealed milling chamber during the entire milling process for 70 hours, as plotted in FIG. 5b, but no pressure change was observed in Ar gas. The pressure reduction could be explained by gas absorption onto newly-created surfaces, which is confirmed by the presence of nitrogen, with the content increasing gradually up to 2.6 wt. % in the milled samples (FIG. 5b). Ammonia pressure drop was also observed during milling of other materials. However, the continuous pressure reduction does not correlate with the surface area change over the milling process.

FIG. 5c shows that the surface area of graphite increases rapidly at the beginning of the milling and reaches a maximum value of about 52 $m^2/g$ after 10 hours and then drops down to 43 $m^2/g$ because of the formation of agglomerates under milling impacts. The surface area results suggest that nanosheets have been produced after 10-15 hours of milling treatment, indicating an efficient production process. The surface area remains approximately constant during further milling up to 70 hours, while the $NH_3$ gas pressure decreases continuously suggesting chemisorption on carbon. The chemisorption of $NH_3$ molecules might happen, especially during further milling.

Heating of the milled samples in the thermal gravimetric analyser (TGA) in Ar gas flow was conducted to test the absorption nature. The gas molecules physisorbed on the surface can be removed under 200° C., but the sample milled in $NH_3$ was degassed up to 350° C. as indicated by an additional weight loss of 3.2 wt % above 200° C. Extra $NH_3$ might be chemisorbed on the edges or vacancies created by ball milling. The broken edges of the nanosheets presumable act as preferred sites for chemisorption of gas molecules with formation of strong chemical bonds. The TGA result as well as the continuous reduction of ammonia gas over the whole milling process indicate a superior gas adsorption taking place on the nanosheets, which might play an important role for protecting the nanosheet structure and morphology.

Further analysis, using near-edge X-ray absorption fine structures (NEXAFS) spectroscopy, was conducted to find possible attachment of amine or nitrogen on graphite nanosheets. FIG. 5d shows the N K-edge NEXAFS spectra of the graphite after milling in $NH_3$ for 5, 20 and 70 hours, respectively. Each spectrum has three relatively sharp π* resonances and broad σ* peaks at higher energies. The three π* resonances represent nitrogen atoms in four possible chemical environments. From low to high energy, they are pyridinic nitrogen at 398.7 eV (blue peak 1), pyrrolic nitrogen and amine both at 399.9 eV (red peak 2), and graphitic nitrogen at 401.4 eV (green peak 3). Although it is difficult to distinguish pyrrolic nitrogen from amine due to their similar energies, the comparison between the spectra of the graphite milled in $NH_3$ for different times implies that the intensities of the three sub-peaks from graphite milled in $NH_3$ increases with the milling process, which is consistent with the nitrogen testing results in FIG. 5b. The stronger peaks of pyrrolic nitrogen/amine and graphitic nitrogen suggest that $NH_3$ molecules are decomposed, producing amine and nitrogen functionalities on carbon.

Figure 6:
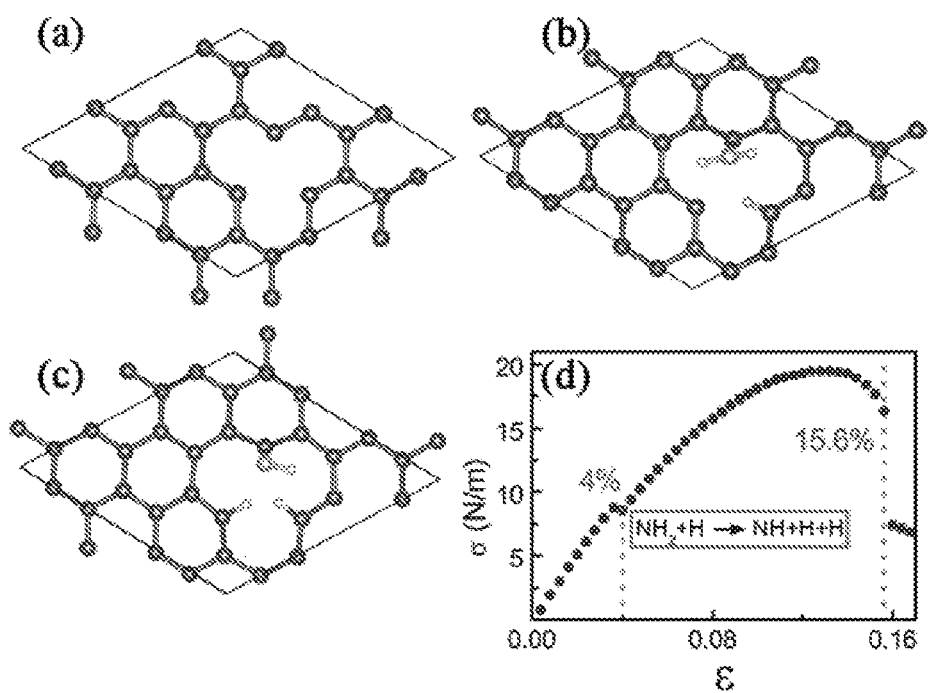
FIG. 6. DFT modeling of amine terminations on graphene. (a) A defect graphene model used in the simulation. (b) The attached $NH_2$ and H configurations decomposed from a $NH_3$ molecule on the defect graphene at 1% strain. (c) The attached NH, H and H configurations decomposed from the $NH_3$ on the defect graphene at 4% strain. (d) Stress-strain curve for a defect graphene with $NH_3$ attachment.

The influence of this functionalization on mechanical strength of nanosheets was investigated theoretically using Density Functional Theory (DFT) on a graphene sheet in different gases ($N_2$ and $NH_3$). FIG. 6a presents a defective graphene model (a single atom vacancy in a graphene sheet) used to calculate the mechanical properties. FIG. 6d plots the change of stress as a function of biaxial strain for the defective graphene in the presence of the adsorbed $NH_3$. The calculation shows that the critical strain required for fracturing defective graphene is around 14%, but is decreased to 13.2% with $N_2$ adsorption. In contrast, the critical strain required for fracturing defective graphene with $NH_3$ absorption at the same site increases to 15.6%. To explore the remarkable difference of the mechanical strength of the graphene sheets with $N_2$ and $NH_3$ attachment, the adsorption configurations for $N_2$ and $NH_3$ on a defective graphene at different strains were examined. The calculation results show that the adsorption thermodynamics and kinetics for the $NH_3$ attachment on a defective graphene can be significantly different under the strain. Under 1% strain, the absorbed $NH_3$ molecule is first dissociated into $NH_2$ and H radicals (FIG. 6b) and then the $NH_2$ group is further dissociated into NH and H atoms without activation barrier when the strain is increased to 4%, confirming a mechanochemical reaction (FIG. 6c). All carbon atoms at edge sites with unsaturated bonds are saturated by the dissociated NH and H atoms. In contrast, $N_2$ remains physisorbed on the defective graphene without dissociation of $N_2$ molecules until fracture because of a large bonding energy in triple N=N bond. So the experimentally observed difference in strength in different gases (in particular $N_2$ and $NH_3$) can be attributed to the large difference between adsorption of $N_2$ and $NH_3$ molecules and their interactions with carbon. Mechanochemical processes certainly play a role in these cases. Similar to the adsorption of $NH_3$ on defective graphene, the attachment of $NH_3$ has been found to enhance mechanical strength in a defective BN monolayer from 13.6% to 14.4%.

Figure 7:
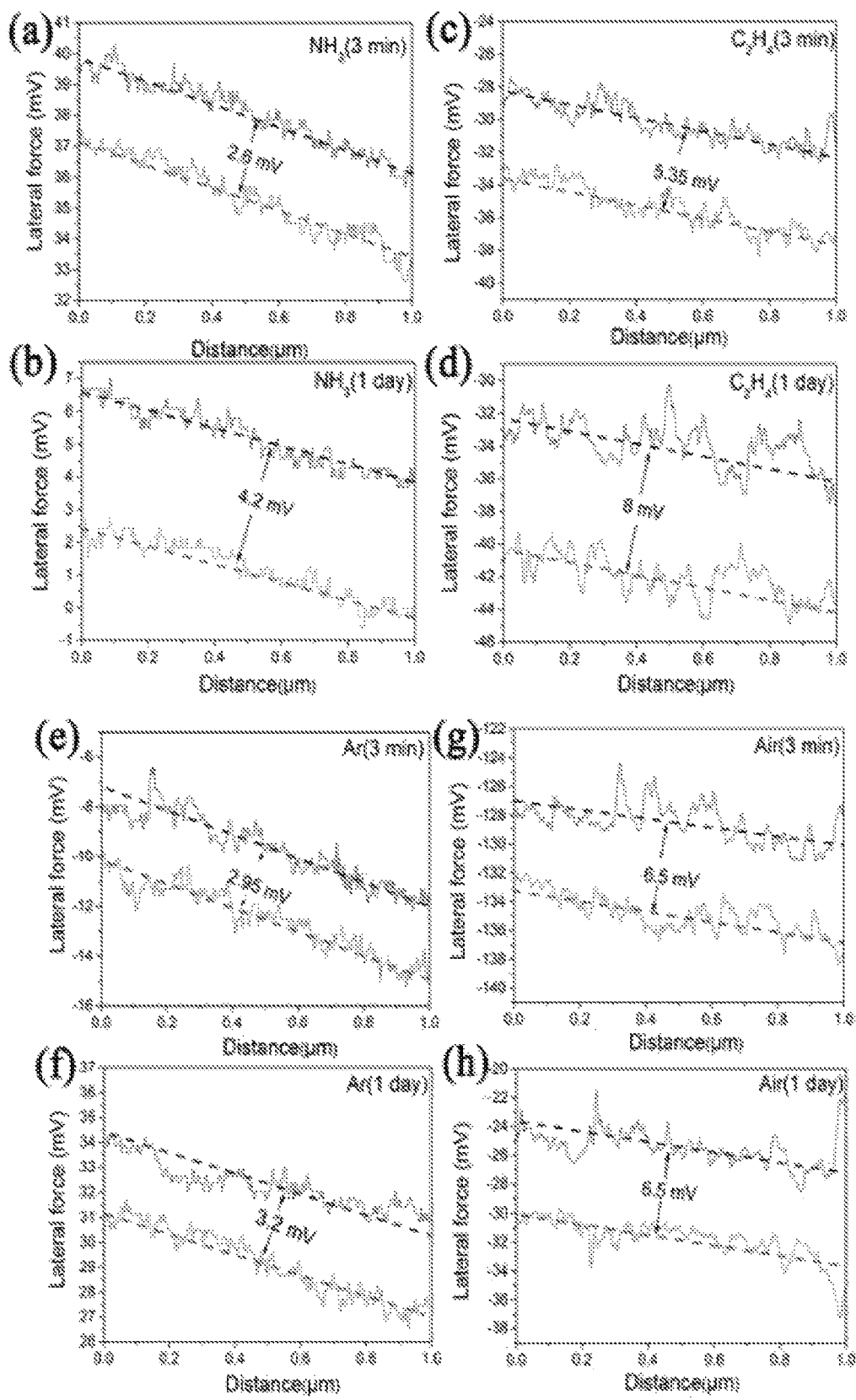
FIG. 7. Lateral friction force measured on BN nanosheets after taking out from $NH_3$ atmosphere for 3 mins and 1 day.

A possible lubricating effect of $NH_3$ on BN nanosheets was also investigated by measuring the friction force of nanosheets in various gases with lateral force microscopy. As the atomic force microscope used cannot measure the friction in $NH_3$ atmosphere in situ, a BN nanosheet was first exposed to $NH_3$ gas at a pressure of 350 kPa for 24 hours and then taken out for friction force measurement immediately under ambient condition (FIG. 7a), a second measurement was conducted after 24 hours on the same sample to see the friction change (FIG. 7b). The surface friction force of a BN nanosheet increases from 2.6 to 4.2 mV (about 60% greater) after left in air for 1 day. The increased friction might be due to the release of $NH_3$ gas from the nanosheet surface after exposure in air during 24 hours. These results suggest that $NH_3$ gas functions as a surface lubricant and reduces the friction between BN nanosheets and the milling bodies, reducing the shearing force applied on the nanosheets in the ball milling process. The friction force increase of a BN nanosheet surface in $C_2H_4$ is 1.96 mV. The friction force variation measured in Ar was only 0.29 mV, i.e., not much change when compared with the friction force in air.

Without wishing to be bound by theory, these results may explain in part the protective effect of $NH_3$ and $C_2H_4$, which might be responsible for the flat and deformation free behaviour of the nanosheets under high-energy impacts; but the saturation of dangling bonds may be the main reason for preventing structural damage under high-energy impact.

Substantial dissociation of $NH_3$ molecules during ball milling has been reported previously in the case of the milling of metal powders (Zr, Ti and Mg) or B in $NH_3$ for mechanochemical synthesis of metal nitrides and BN nanotubes. In the current case, the pressure remains low and hydrogen atoms are believed to be absorbed on the nanosheets instead of releasing into the milling chamber. Therefore, the theoretically predicted ammonia dissociation and attachment is possible.

Similar mechanisms probably act when graphite is ball-milled with melamine to produce few-layer graphene flakes. The saturation of dangling bonds is the main reason for preventing structural damage under high-energy impact. If defects are created, cross-linking of graphene (or BN) layers occurs, making shearing of the graphite flakes impossible and leading to fracture and fragmentation of the material, which creates new unsaturated bonds, and so on, until a highly disordered or even amorphous structure is formed.

Due to the chemisorption and mechanochemical reactions in reactive ammonia or hydrocarbon environments, nanosheets appear to be able to self-heal structural damage, which helps the exfoliation of bulk crystals into nanosheets and also protects their in-plane structures. SEM and TEM analyses found that most nanosheets remain flat and do not undergo severe plastic deformation (folding or twist) or cross-linking between layers. These gas molecules are chemisorbed on defects and edges, saturating dangling bonds and preventing cross-linking of graphene or BN layers and further damage. Therefore, the nanosheets remain indestructible, even under high-energy ball milling conditions. DFT supports chemical bonding in the presence of ammonia. Under stress, $NH_3$ can be decomposed to form $NH_x$ groups that form bonds with C or B radicals in BN. In the case of $N_2$ and $H_2$, only physisorption takes place, but chemical bonding with C or B is difficult because of a higher energy required to break diatomic molecules (dissociation energy of N—N bond is 945 kJ/mole). Therefore, $N_2$ does not show the protective effect. Decomposition of $C_2H_4$ and $CH_4$ is relatively easy because of a relatively low dissociation energy of C—H bonds (400-460 kJ/mole), and thus a similar protective effect is observed.

In the current case, pure graphene nanosheets have been produced by ball milling of graphite in hydrocarbon gas. In addition, BN and $MoS_2$ nanosheets have been successfully produced using mechanochemistry. Thus, mechanochemical treatment of layered materials provides a new general approach for mass production of nanosheets with a fairly low density of defects using a short milling time of less than 20 hours. The nanosheets can be used as solid lubricants, additive to polymers, battery electrodes and many other applications where large amounts of multilayer 2D flakes or nanosheets are needed.

Nanosheets of graphene, BN, and $MoS_2$ were protected by $NH_3$, $C_2H_4$ and $CH_4$ gases under high-energy ball milling, while amorphous or highly disordered nanoparticles were produced in Ar, $N_2$, and $O_2$ under the sample milling processes. The differences are believed to be due to superior gas absorption and the mechanochemical reaction of reactive gases with dangling bonds formed during milling and chemisorption of reactive species, terminating bonds and preventing the cross-linking of layers due to the formation of bridging bonds. This milling process in the reactive gas can be used to produce large quantities of different nanosheets.

Example 2

Carbon and Nitrogen Doped $WS_2$ Nanosheets Produced by High Energy Ball Mill

Figure 8:
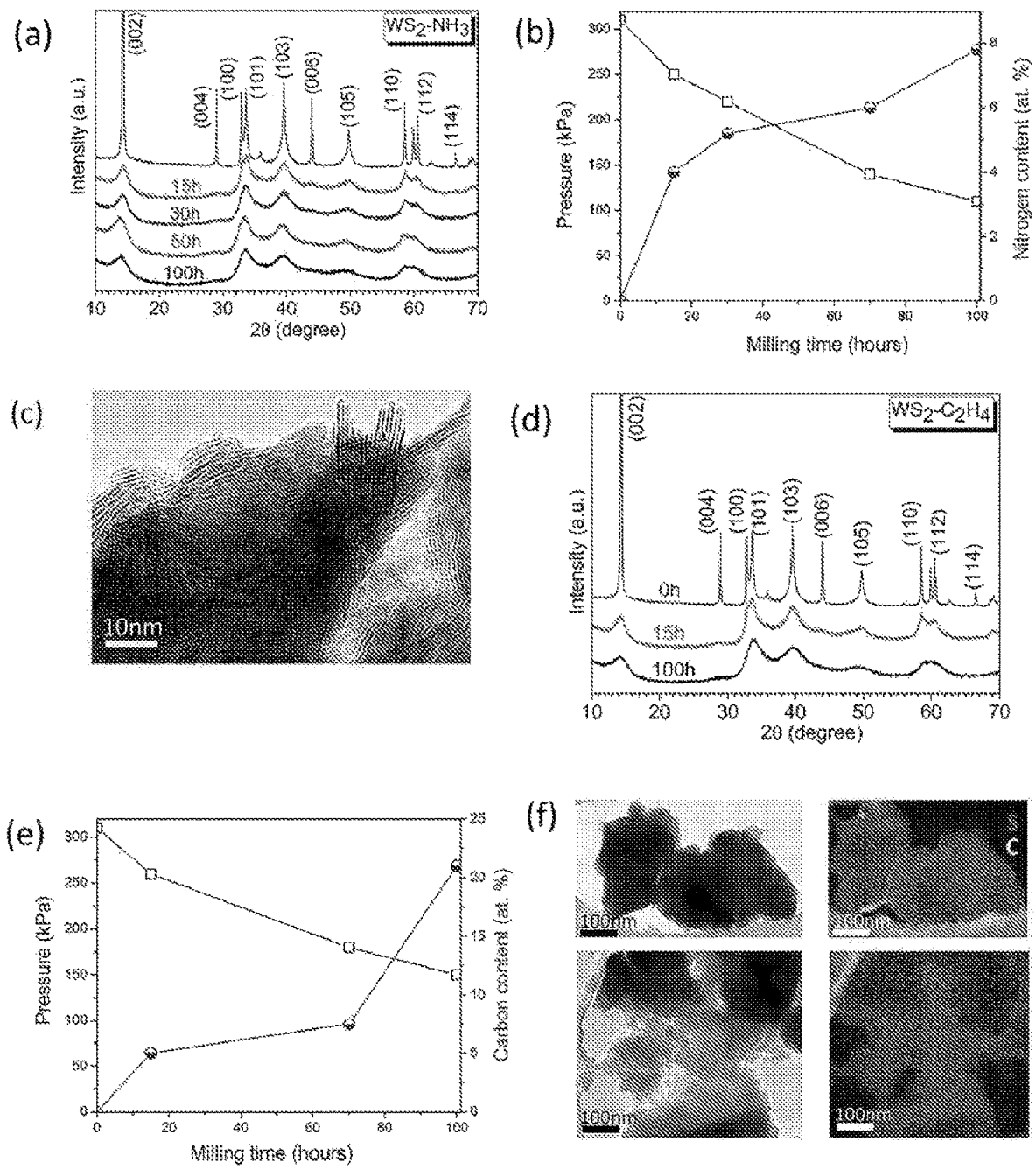
FIG. 8. Different structural changes of $WS_2$ during ball milling in $NH_3$ and $C_2H_4$. XRD patterns of $WS_2$ milled in $NH_3$ (a), $C_2H_4$ (d). Nitrogen and carbon content with pressure during milling (b, e). TEM image of $WS_2$ milled for 30 h in $NH_3$ (c). EDS overlay image of $WS_2$ milled in $C_2H_4$ (f).

Tungsten disulphide ($WS_2$) was milled in ethylene ($C_2H_4$) and in ammonia ($NH_3$) for producing N or C doped $WS_2$ nanosheets From the XRD patterns (FIGS. 8(a) and (d)), show the peaks become broader and weaker, suggest that the layered structure remains same till 100 h of milling. FIG. 8(c) shows layered structure $WS_2$ with thin layers after milling 30 h in $NH_3$. As the milling time increases the pressure decreases and carbon and nitrogen content increases (FIG. 8(b), 8(e)) in samples milled in ethylene and ammonia gas respectively. Carbon content is around 21 at. % in nanosheet sample milled in $C_2H_4$ for 100 h, whereas nitrogen content is about 9 at. % for sample milled in $NH_3$ for 100 h. To further investigation, Energy-filtered TEM (EFTEM) was used to visualize the elemental distribution in the sample. A part of the sample suspended over a hole in a holey carbon film was chosen as the place for EFTEM mapping, as shown in FIG. 8(f). This confirmed the presence of carbon in $WS_2$ milled in ethylene gas.

Synthesis and Characterization

The samples were prepared as follows. Tungsten disulphide ($WS_2$—Sigma Aldrich) was used as starting material. 4 grams of materials and four hardened steel balls with a diameter of 25.4 mm each were loaded in a stainless steel milling container. The milling container was then evacuated and filled with reactive gas (ethylene ($C_2H_4$) or ammonia ($NH_3$)) with starting pressure of 310 kPa. High energy ball in conjunction with an external magnet was used to mill a rotation speed of 160 rpm.

The crystalline structure and phase and alignment of sintered samples investigated by X-ray diffraction (XRD) using a PANalytical X'pert powder (Cu K-alpha radiation, $\lambda=0.15418$ nm) operated at 40 kV with 30 mA current. XRD data were recorded over a range of 10–70° with a step time and size of 150 s and 0.02, respectively. Chemical composition was analysed by Energy-filtered TEM (EFTEM). Crystal structure were investigated by transmission electron microscope (TEM, JEOL 2100F) with acceleration voltage of 200 kV.

Example 3

Synthesis of Composite Nanosheets of Graphene and Boron Nitride and their Use in Lubricants 1. Experimental Commercial graphite and h-BN powders with diameters of less than 40 μm were chosen as starting particles, an optimized high-energy ball milling process was conducted to produce the graphite and h-BN composite nanosheets in an ammonia atmosphere. Several grams of graphite and h-BN mixture with a graphite to h-BN weight ratio of 1:1 were added into a steel vial. 25 mm steel balls with a ball-to-powder weight ratio of 64:1 were loaded in the vial too. The rotating speed was 140 rpm. The vial was sealed and filled with 310 kPa of ammonia ($NH_3$) gas.

The structure of the nanosheets obtained was examined using X-ray powder diffraction (PANalytical X'pert Powder, Cu K-alpha radiation, $\lambda=0.15418$ nm). A scanning electron microscope (Hitachi S4500 Zeiss Supra 55VP) and a transmission electron microscope (JOEL JEM-2100F) were used to characterize the morphologies and structures of composite nanosheets. To examine sample chemical composition, electron energy loss spectroscopy (EELS) and energy-filtered transmission electron microscopy (EFTEM) were performed using Gatan Quantum ER 965 Imaging Filter attached to the JEOL JEM-2100F instrument. EELS spectra were acquired in the imaged-coupled mode (TEM was in diffraction mode with an area of interest defined by a selected area diffraction aperture), and the elemental maps were acquired using the three-window method.

2. Results and Discussion 2.1 Composite Nanosheet Synthesis

Figure 9:
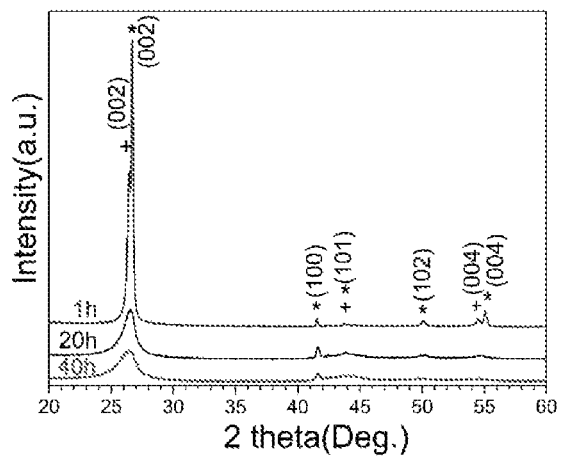
FIG. 9 XRD patterns of BN and graphite with different ball mill time, +: graphite and *: BN.

FIG. 9 shows the XRD spectra of graphite and BN mixtures milled for different periods of time. After being ball milled for 1 h, the XRD spectra of the graphite and BN mixture shows two strong (002) characteristic peaks between 26° and 27°. By referring to the XRD spectra of commercial graphite and BN, the peak located at 26.5° can be identified as originating from graphite and the peak at 26.7° belongs to BN phase. Similarly, two obviously (004) peak are located between 54° and 56°, the peak located at 54.5° is belongs to graphite and the peak at 55° is belongs to BN. With extended mill time, the obvious characteristic peaks of typical hexagonal structures (002) and (004) peaks is weaker and broaden because of size reduction. The (100), (101) and (004) peaks are almost vanished. This result suggests that the thickness-to-size ratio of starting particles was reduced and the nanosheets have been exfoliated from bulk materials after ball milling for 20 h or 40 h. Additionally, two individually (002) and (004) were combined to one peak, which has revealed that the homogenous graphite and BN nanosheets were combined into graphite/BN composite nanosheets.

Figure 10:
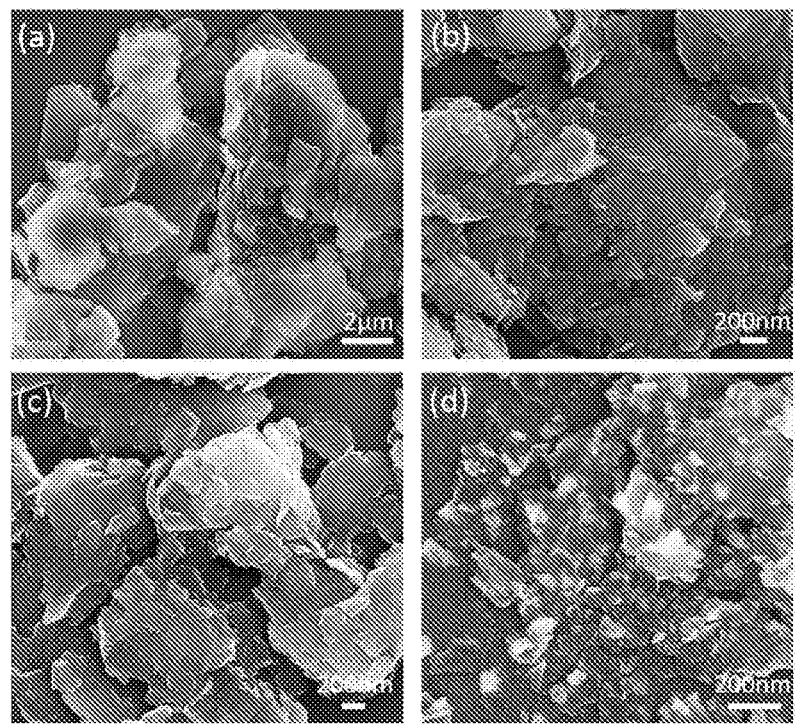
FIG. 10 (*a*) SEM images of ball milled 1 h samples; (b) ball milled 20 h samples; (c) ball milled 40 h samples; (d) ball milled 20 h samples without carbon coating.

The SEM images reveal the morphologies of composite nanosheets synthesized after different ball milling time, as shown in FIG. 10. Thin carbon coating was used to reduce the charging effect from insulating BN samples. After the BN and graphite mixture were ball milled for 1 h, the particles were thick and blocky, and the diameter was still over 2 μm, as shown in FIG. 10(a). However, as the milling time increased, the layered structure was exfoliated more completely. After being milled for 20 h, nanosheets with a large surface and uniform size can be seen clearly in FIG. 10(b). Multiple composite nanosheets are loosely stacked with distinct edges and the nanosheets have diameters of larger than 200 nm. After continuing to extend milling time to 40 h, the size of individual composite nanosheets was further reduced, and the diameter of the nanosheets was approximately 100 nm, as shown in FIG. 10(c). After ball milled for 40 h, the graphite/BN composite nanosheets were compactly stacked with inconspicuous border, which seems that individual composite nanosheet agglomerated and formed clusters. The starting particles suffered shear force and fragmentation force during the ball milling procedure. The shear force is responsible for shearing weakly interlayered van der Waals bonds that exfoliate bulk materials into nanosheets, so excessive milling time such as 40 h led to the size of individual nanosheets to further decrease and made the nanosheets agglomerate tightly.

Graphite/BN composite nanosheets were produced by 20 h ball milling process with the same optimized ball milling condition mentioned before, FIG. 10(d) was the SEM image of the graphite/BN composite nanosheets obtained and observed at low voltage. It is evident that insulating BN nanosheets (white area) with diameter less than 100 nm are dispensed homogenously on the dark graphite nanosheets forming a stacked composite structure.

Figure 11:
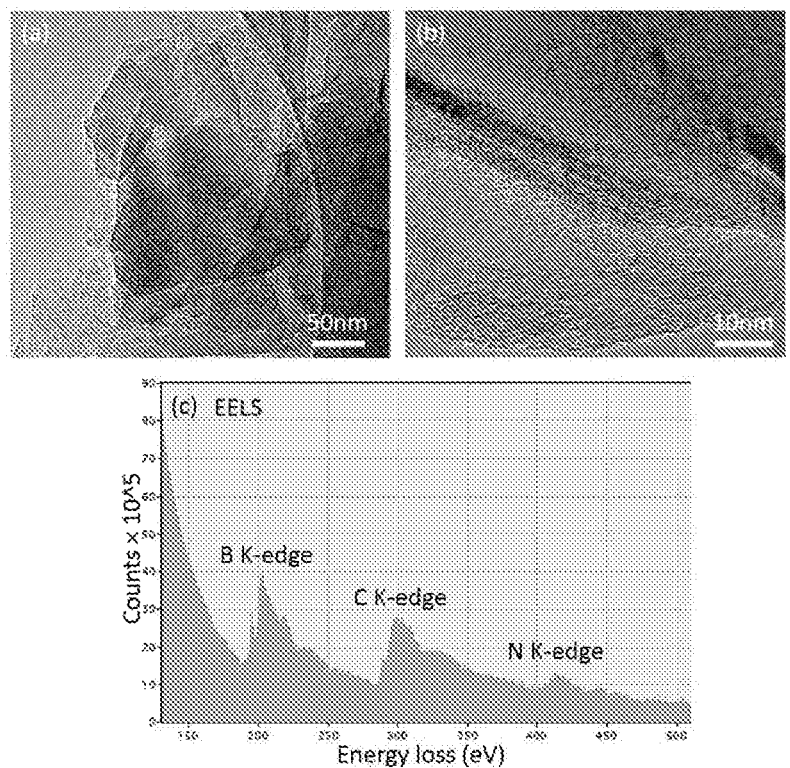
FIG. 11 (*a*) TEM images of graphite/BN composite nanosheets produced after ball milling for 20 h; (b) high-magnification TEM image; (c) EELS spectrum of graphite/BN nano sheets.

To further reveal the microstructure of graphite/BN composite nanosheets, a 20 h milling sample was investigated using TEM and EELS. FIG. 11(a) shows an edge of composite nanosheets suspended on a porous carbon film. It can be clearly seen that multiple nanosheets are irregularly stacked together, and a high transparency region shows where less nanosheets are stacked in that area, and vice versa. The thickness of the composite nanosheets can be estimated from a side view of the structure as observed in a high-magnification TEM image shown in FIG. 11(b). It appears that each individual graphite or BN nanosheet is made up of approximately 10 monolayers of graphene or BN, and the typical thickness of the composite nanosheets is less than 10 nm. The EELS spectrum in FIG. 11(c) shows the elemental edges of B, C and N, indicating that the composite nanosheets were established by BN and graphene.

Figure 12:
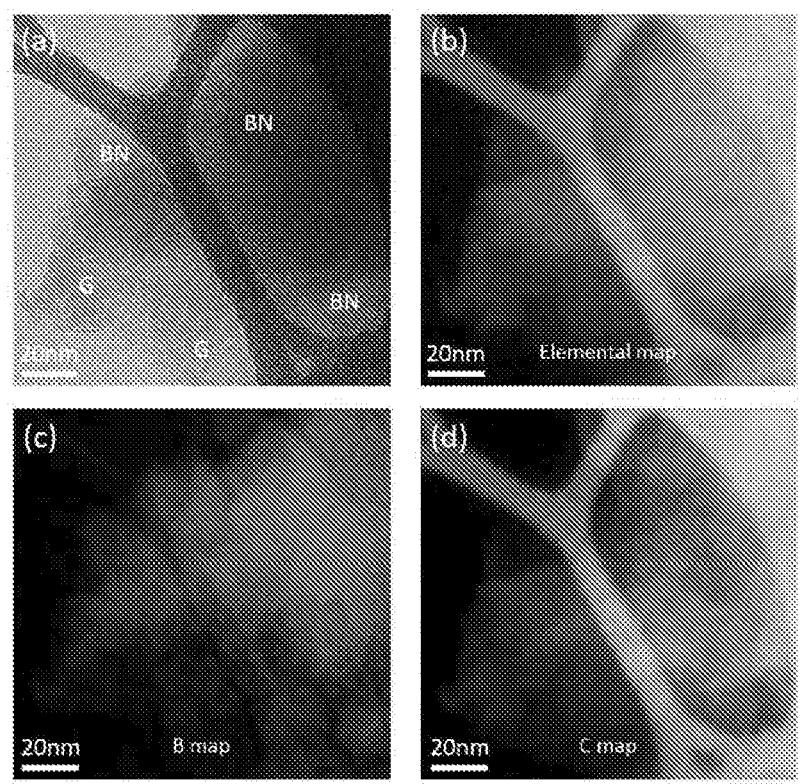
FIG. 12 Energy-filtered TEM data: (a) an elastic TEM image; (b) an energy-filtered image of the same area with elemental contrast (boron-red, carbon-green); (c, d) individual energy-filtered maps of boron and carbon.

Energy-filtered TEM (EFTEM) was used to visualize the elemental distribution in the sample. A part of the sample suspended over a pore in a porous carbon film was chosen as the place for EFTEM mapping, as shown in FIG. 12(a). The distribution of elements is shown in an energy-filtered image (FIG. 12(b)), where boron is marked in dark shade and carbon is depicted in light shade. The individual energy-filtered maps of boron and carbon are displayed in FIGS. 12(c) and (d). The regions overlap with each other, according to carbon and boron maps, and the graphite nanosheets and BN nanosheets can be identified. It can be concluded that the composite nanosheets are constructed by stacking of multiple graphite nanosheets and BN nanosheets together.

This example shows large-scale production of graphite/BN composite nanosheets can be achieved via a high-energy ball milling from graphite and h-BN powders in ammonia gas. The size and morphologies of composite nanosheets were impacted by different periods of milling time and thereby further affected the lubrication properties. The composite nanosheets have better lubrication properties than homogenous nanosheets. This is believed to be because of stronger interaction between graphene and BN nanosheets, which can effectively improve the lubrication properties of mineral base oil as a lubricant additive.

The invention claimed is:

1. A process for producing non-functionalized nanosheets or doped nanosheets of a bulk crystalline material having a layered structure, the process comprising providing a dry ball milling apparatus; and using the dry ball milling apparatus to ball mill the bulk crystalline material in a reactive gas selected from ammonia and a hydrocarbon, wherein the non-functionalized nanosheets or doped nanosheets (i) are formed in the ball milling apparatus during ball milling by adjusting one or more dry ball milling parameters of the dry ball milling apparatus selected from milling time, milling speed, milling ball size and milling ball-to-bulk crystalline material weight ratio, and (ii) have a thickness of less than 10 nm.

2. A process according to claim 1, wherein the bulk crystalline material having a layered structure is selected from graphite, boron nitride, molybdenum disulphide and tungsten disulphide.

3. A process according to claim 1, wherein the hydrocarbon gas is selected from, methane, ethane, ethene, ethyne and propane.

4. A process according to any one of claims 1 to 3, wherein the ball milling takes place using a mixture of the reactive gases to produce doped nanosheets.

5. A process according to any one of claims 1 to 3, wherein the bulk crystalline material comprises a mixture of bulk crystalline material having layered structures, and the mixture is milled in the dry ball milling apparatus to produce composite nanosheets.

6. A process according to any one of claims 1 to 3, wherein the ball milling takes place for less than 30 hours.

7. A process according to any one of claims 1 to 3, wherein the ball milling speed is selected from 140, 150 or 160 rpm.

8. A process according to any one of claims 1 to 3, wherein the milling ball size ranges form 1-25 mm in diameter.

9. A process according to any one of claims 1 to 3, wherein the milling ball-to-bulk crystalline material weight ratio ranges from 5:1 to 20:1.

* * * * *